Patented Apr. 17, 1945

2,373,786

UNITED STATES PATENT OFFICE 2,373,786

PRODUCTION OF CELLULOSE ESTERS

George W. Seymour, Mervin E. Martin, and Robert D. Rowley, Cumberland, Md., assignors to Celanese Corporation of America, a corporation of Delaware No Drawing. Application April 28, 1942, Serial No. 440,828

17 Claims. (Cl. 260—230)

This invention relates to improvements in the production of cellulose esters, and is more particularly concerned with the production of cellulose acetate or other cellulose esters, particularly lower fatty acid esters of cellulose.

An object of our invention is the production of organic esters of cellulose having increased stability.

Another object of our invention is to reduce substantially the time necessary for the production of said cellulose esters.

Still another object of our invention is the production of organic esters of cellulose having a content of combined sulphuric acid sufficiently low so that the use of stabilization treatments may be substantially reduced or entirely eliminated.

Other objects of our invention will appear from the following detailed description.

In the process of preparing organic esters of cellulose, the esterification of cellulose is usually carried out by treating cellulose with an organic acid anhydride in the presence of a catalyst such as sulfuric acid and an organic acid diluent or solvent for the ester of cellulose being formed. The esterified cellulose is obtained in the form of a viscous, homogeneous solution in the organic acid diluent, to which water is added in amounts sufficient to convert any organic acid anhydride remaining into the corresponding acid. The cellulose ester, usually after the addition of a further quantity of water, is permitted to hydrolyze or ripen to develop the desired solubility characteristics. Water and/or other non-solvent for the cellulose ester is then added in sufficient amounts to precipitate the cellulose ester from solution. The cellulose ester is finally washed and/or treated with water to free it of acids as much as is possible.

In the preparation of cellulose acetate in accordance with the above process the cellulose, with or without a pretreatment with organic acids or organic acids containing some sulphuric acid, is usually acetylated by treatment with acetic anhydride and a catalyst, such as sulphuric acid, in the presence of glacial acetic acid as a solvent for the cellulose acetate formed. The sulphuric acid catalyst is usually present in amounts of from 9 to 15%, or even 20%, on the weight of the cellulose. Part of this sulphuric acid may be introduced in the pretreatment, which is designed to make the cellulose more reactive. When the acetylation is completed, water is stirred into the reaction mixture to convert the excess acetic anhydride to acetic acid, and, after the addition of a further amount of water, the resulting solution of cellulose acetate in acetic acid is permitted to stand until the desired solubility characteristics are reached. During this standing or ripening period, not only are acetyl groups split off, but in addition combined sulphuric acid is split off. When the desired solubility characteristics are reached further ripening is halted and the mixture is treated with a large excess of water or other non-solvent to precipitate the cellulose acetate. After precipitation, the cellulose acetate is washed with water to remove as much acid and other non-cellulose ester materials as possible and is then subjected to a stabilizing treatment, usually by heating it in suspension in very dilute sulphuric acid, with the object of still further reducing its content of combined sulphuric acid. The degree of stability is measured by the degree of acidity developed when a sample of cellulose acetate is treated with distilled water under conditions of elevated temperature and pressure for a predetermined period of time. The development of excessive acidity denotes a product of unsatisfactory stability.

During the preparation of cellulose acetate by the above method, the acetylation may take from 1½ to 7 hours and the ripening from 20 to 45 or 50 hours, while the stabilizing treatment may take from 3 to 6 hours to achieve the desired stability in the product. Not only does this process consume an excessive amount of time due to the prolonged ripening period and necessary stabilization treatment, but these extended treatments seriously limit productive capacity. In addition, the stabilization treatment consumes substantial amounts of sulphuric acid and thus adds to the cost of production.

We have now discovered that cellulose acetate, as well as other organic esters of cellulose, of improved stability may be prepared in a relatively short period of time without requiring a stabilizing treatment or at most requiring a short stabilizing treatment. These highly desirable results may be achieved, if, after an esterification reaction, as described, the cellulose acetate so produced is ripened in a step-wise manner to the desired solubility characteristics, i. e., ripened in a plurality of distinct stages. Our novel method of ripening comprises a process in which the ripening may be achieved in two, three, or even four or more distinct ripening stages, with the method being particularly characterized in that for at least most of the ripening stages, where more than two ripening stages are employed, the amount of catalyst present during ripening is caused to be decreased and the quantity of water present increased in each ripening stage. Thus, when ripening cellulose acetate, for example, the sulfuric acid present during ripening is adjusted to a progressively lower value for at least most of the stages while at the same time the water present during ripening is progressively increased. By this stepwise process, comprising reducing the amount of catalyst and increasing the amount of water, for the separate stages, cellulose acetate may be ripened to acetone-solubility in a materially shortened time and the cellulose acetate so produced is eminently suitable for the production of yarns, filaments, films, sheets, foils, etc., of improved properties.

In accordance with one mode of practicing our invention, cellulose acetate may be ripened in a step-wise manner by ripening procedures comprising a two stage process. When ripening by this method, for example, a part of the water for ripening may be added prior to any neutralization of the catalyst and the cellulose acetate ripened for a short period of time, which period comprises the first ripening stage. This added water is, of course, in addition to that added to destroy excess anhydride. For the second stage of ripening a further quantity of water is added together with an amount of neutralizing agent sufficient to decrease the quantity of sulphuric acid present to a predetermined degree, and ripening is conducted to the point where the desired solubility characteristics are achieved. The cellulose acetate may then be precipitated from solution by the addition of an excess of water or other non-solvent. When ripening by this method, for example, we have found that about 10% of water, on the weight of the cellulose originally acetylated, may be advantageously added for the first ripening stage and the ripening conducted at about 40° to 45° C. for from 1 to 3½ hours. At the completion of the first stage, water may be added in an amount equal to from 60% to 90% on the weight of the cellulose, together with an amount of neutralizing agent sufficient to neutralize 50 to 85% of the sulphuric acid present. The neutralization leaves from about 7% to as little as 2%, or less, of sulphuric acid on the weight of the cellulose for the second stage ripening. The latter may then be conducted at from 30° to 50° C., or more, until the desired solubility characteristics or acetyl value are reached. The products obtained by ripening with this two stage method are of excellent stability, particularly where the second stage of ripening is carried out with 2% or less of free sulphuric acid on the weight of the original cellulose.

More desirable results are obtained, however, if the two stage ripening process is carried out in such a manner that the sulphuric acid present during ripening is partly neutralized for the first stage of ripening as well as for the second stage, and water for ripening is added in each of the ripening stages. When ripening is conducted in accordance with such a two stage process, the sulphuric acid present for the first ripening stage may be reduced, by the addition of a suitable neutralizing agent, to a value of from 10 to 2%, based on the weight of the cellulose. That is, from 28.5 to 85.7% of the amount of sulphuric acid originally in the acetylation mixture is neutralized while the water added for ripening may be from 5 to 25%, based on the weight of the cellulose originally present. The acetic acid solution of cellulose acetate, thus obtained, containing the water for ripening and having a reduced sulphuric acid content, is then permitted to ripen at a temperature of from 25 to 55° C. for a period which may be from 1 to 5 hours. For the second ripening stage, the sulphuric acid content is further reduced in the same manner as for the first ripening stage to from 5 to about ½%, on the weight of the original cellulose. In other words, about 64.3 to about 96.4% of the amount of sulphuric acid originally present is neutralized. More water is added for ripening, so that the total amount of water added is from 25 to 150% on the original weight of the cellulose. The second stage ripening is continued at a temperature of from 25 to 117° C. until the desired solubility characteristics are reached, after which the cellulose ester may be precipitated from solution by the addition of an excess of water or other non-solvent.

The cellulose acetate may also be ripened by a process comprising three distinct ripening stages. When ripening in three stages, very desirable results are obtained when neutralizing agent and water for ripening are added in but two of the stages, while for the other stage water only is added. The addition of water without the addition of neutralizing agent may comprise either the first, second or third stage of ripening, but, preferably, the addition of water alone is made for the latter stage. Thus, for example, after the acetylation has been completed and the excess anhydride has been converted to acetic acid by the addition of water, sufficient neutralizing agent may be added to neutralize from 20 to 98% of the sulphuric acid present and water added in an amount equal to from 5 to 50% on the weight of the original cellulose. The first ripening stage can then be carried out at temperatures of from 25 to 55° C. for from 1 to 5 hours. At the end of the first stage additional neutralizing agent is added in an amount sufficient to neutralize from 40 to 50% of the sulphuric acid remaining, making a total neutralization of 50 to 99% of the sulphuric acid originally present, and additional water is added to make a total addition of from 30 to 75% on the weight of the cellulose. Ripening is conducted at from 40 to 75° C. for 2 to 7 hours, preferably to a point where a precipitated sample of the cellulose acetate is soluble in hot chloroform. A further addition of water is made for the third ripening stage in an amount sufficient to bring the total added to from 50 to 200% on the weight of the cellulose. Preferably, the total water added is from 50 to 150% on the weight of the cellulose. The third stage of ripening is continued until the desired acetyl value is reached. Ripening is halted by the addition of sodium carbonate, or the like, in an amount sufficient to neutralize the sulphuric acid remaining. The cellulose acetate is then precipitated and washed and, if desired, may be stabilized. The stability obtained by this latter method of ripening, however, is usually so high that the cellulose acetate is entirely satisfactory and the stabilization may be entirely eliminated. If a particularly high degree of stability is desired it may be obtained after a stabilizing treatment of as little as 1 hour, in contrast to the usual stabilizing treatment of 3 to 6 hours or more.

The water for ripening may be added as such or may be added advantageously in the form of a dilute solution of acetic acid to avoid any substantial precipitation of the cellulose acetate. The neutralizing agent may be added together with the water for ripening, particularly if this is added in the form of a dilute solution of acetic acid, or it may be added separately, for example, in solution in glacial acetic acid.

The neutralizing agent employed may be a salt of magnesium or calcium, such as magnesium acetate, calcium acetate, magnesium carbonate, or calcium carbonate, or it may be another compound such as zinc acetate or zinc oxide, or it may be a mixture of two or more of these compounds. The neutralizing agent preferably employed comprises a mixture of magnesium acetate and calcium acetate.

Prior to acetylation the cellulose may, for example, be pretreated with acetic acid or formic acid, or mixtures of these acids. The acids may be present in a small amount, for example, 1 to 50% on the weight of the cellulose, or in much larger quantities, for example 100%, 200% or even 300% on the weight of the cellulose, and may contain a small quantity of sulphuric acid, for instance ½ to 1 or 2% on the weight of the cellulose. The pretreatment is preferably allowed to go on for some hours, for example overnight, though much shorter periods may be used when sulfuric acid is present. The pretreated cellulose is then treated with acetic anhydride and sulphuric acid in appropriate amount to bring about acetylation.

The cellulosic materials esterified in accordance with our process may be any suitable form of cellulose or cellulose derivative. It may be cotton, cotton linters, wood-pulp, regenerated cellulose, or other cellulosic material obtainable from various other sources such as grasses, straws, hulls and the like.

In order further to illustrate our invention, but without being limited thereto, the following examples are given:

*Example I*

170 parts by weight of cotton are acetylated with 630 parts of acetic acid, 358 parts of acetic anhydride and 24.65 parts of sulphuric acid. The time of acetylation is 3 hours during which time the mixture is allowed to attain a peak temperature of 43° C. After the acetylation is completed, water in an amount sufficient only to react with any excess acetic anhydride is added to the reaction mixture.

There is then added to the acetylation mixture sufficient neutralizing agent to neutralize 33⅓% of the sulphuric acid present and water in an amount to make an addition of 21% on the weight of the original cotton. The neutralizing agent employed comprises a mixture of magnesium acetate and calcium acetate obtained by reacting calcined dolomite in dilute acetic acid to form said acetates, the resulting clear, aqueous solution being employed as the neutralizing agent. The partially neutralized acetylation mixture is then charged into a ripening tank and heated with brine at 80° C. Ripening of the heated solution is carried out until a sample of precipitated cellulose acetate is soluble in hot chloroform, the ripening to this stage taking 5 hours. At this point, a further addition of neutralizing agent is made sufficient to neutralize another 33⅓% of the sulphuric acid, together with an amount of water equal to 79% of the weight of the cotton, thus making a total water addition of 100%. Ripening is continued, with the solution at about 60° C., for about 3¾ hours at which time the cellulose acetate reaches an acetyl value of 55%, calculated as acetic acid. A solution of sodium carbonate is then added to neutralize the remaining 33⅓% of the original sulphuric acid and to halt further ripening. The cellulose acetate is precipitated from solution by the addition of a large amount of water, and is washed and dried.

The resulting cellulose acetate is of high stability as measured by the amount of acidity developed when a sample is treated with distilled water under conditions of elevated temperature and pressure. With a stabilizing treatment of only one hour, it may be employed satisfactorily for any purpose.

*Example II*

529 parts by weight of cotton are pretreated for 3 hours with a mixture containing 2.645 parts of sulphuric acid, 2.645 parts of water and 185.2 parts of acetic acid. After pretreatment, the cotton is entered into an acetylizer containing 1,775 parts of acetic acid, 1,113 parts of acetic anhydride and 75 parts of sulphuric acid. The time of acetylation is 3 hours. Water is then added in an amount only sufficient to react with any free acetic anhydride.

Sufficient neutralizing solution, prepared as in Example I, is added to the acetylation mixture to neutralize 33⅓% of the sulphuric acid present together with water in an amount equal to 21% on the weight of the original cotton. The mixture is then poured into a ripening tank and heated with hot brine. After ripening for 2 hours at a temperature of 45° C. further neutralizing agent is added sufficient to neutralize another 33⅓% of the original sulphuric acid together with another 21% by weight of water. The water is added as 50% acetic acid solution to avoid precipitation of the cellulose acetate. Ripening is continued for another two hours at a temperature of 45° to 60° C. A water addition of 58% on the weight of the cotton is made as 35% acetic acid solution, making a total water addition of 100%, and ripening continued for 3 hours more until an acetone-soluble product having an acetyl value of 54.5% is produced. Total ripening time is 7 hours. Sodium carbonate is added to neutralize the remaining sulphuric acid and halt ripening. The cellulose acetate is then precipitated from solution by the addition of a large amount of water.

The cellulose acetate obtained by this ripening process is highly stable and requires no stabilizing treatment. If a product of unusually high stability is desired, the cellulose may be given a 1 hour stabilizing treatment.

*Example III*

383 parts by weight of cotton are pretreated for 6 hours with a mixture comprising 4.8 parts of sulphuric acid, 335 parts of acetic acid and 4.8 parts of water. The pretreated cotton containing the pretreatment liquid is charged into an acetylizer containing 805.5 parts of acetic anhydride, 2,095 parts of acetic acid and 71.8 parts of sulphuric acid cooled to −4° C. A peak temperature of 32.5° C. is reached and acetylation is completed in 6 hours. Water is then added in an amount sufficient to react with any acetic anhydride remaining.

Neutralizing agent, prepared as in Example I, in an amount sufficient to neutralize 50% of the sulphuric acid present is now added to the acetylation mixture together with water amounting to 37% on the weight of the cotton. 302 parts of acetic acid are added with the water to prevent precipitation. The solution is then poured into a ripening tank and heated with hot brine at 80° C. After 2 hours ripening with the temperature of the solution at 35 to 40° C., neutralizing agent is again added sufficient to neutralize another 40% of the sulphuric acid, leaving but 2% of sulphuric acid on the weight of the original cotton. Water is also added making a total addition of 74% and ripening continued for 7 hours, during which time the temperature rises from 40 to 65° C. At this point 76% water is added, making a total addition of 150% and ripening continued at 65 to 70° C. for 8½ hours, at which point the cellulose acetate has an acetyl value of 54%. Ripening is halted by the addition of dry sodium bicarbonate to neutralize the remaining sulphuric acid. The cellulose acetate is precipitated by adding water to the acetylation solution. The cellulose acetate has a high degree of stability and may be employed advantageously in the production of yarns, filaments, foils and other materials without any subsequent stabilizing treatment.

*Example IV*

510 parts by weight of cotton linters are pretreated for 6 hours with a mixture comprising 6 parts of sulphuric acid, 25.5 parts of formic acid and 420 parts of acetic acid. The pretreated linters are then charged into an acetylizer containing 1074 parts of acetic anhydride, 1870 parts of acetic acid and 54 parts of sulphuric acid, the mixture being cooled to −15° C. A peak temperature of 36.5° C. is reached and acetylation is completed in a little over 2 hours. Excess anhydride is destroyed by the addition of water.

After the anhydride is destroyed 10% of water on the weight of the original linters is added and the cellulose acetate ripened at 40 to 45° C. for two hours. At this point additional water is added as 50% aqueous acetic acid to make a total water addition of 100% on the weight of the cotton linters and sufficient neutralizing agent added to neutralize 83% of the sulphuric acid present leaving but 2% on the weight of the linters for ripening. The cellulose acetate is ripened at 50° C. for 35 hours and then precipitated. The resulting cellulose acetate is of very high stability and has excellent molding properties.

While our invention is particularly addressed to the acetylation of cellulose employing sulphuric acid as catalyst, other catalysts may be used as well, such as, for example, phosphoric acid, or mixtures of phosphoric acid and sulphuric acid. Preferably, we employ sulphuric acid alone without any other mineral acid present during either acetylation or ripening. In a similar way employing the proper esterifying agent or agents, other cellulose esters may be prepared, for example, the cellulose esters of propionic, butyric or similar acids, or mixed esters, for example, cellulose acetate-propionate or cellulose acetate-butyrate.

It is to be understood that the foregoing detailed description is merely given by way of illustration and that many variations may be made therein without departing from the spirit of our invention.

Having described our invention, what we desire to secure by Letters Patent is:

1. Process for the preparation of cellulose esters of lower mono-carboxylic saturated fatty acids of increased stability, which comprises esterifying cellulose by means of an esterifying agent in the presence of an acid esterification catalyst, and ripening the organic ester of cellulose so produced in solution to the desired solubility characteristics in the presence of water in a plurality of stages, wherein, for at least two of the ripening stages, the amount of said catalyst present is decreased in part by neutralization thereof and the amount of water present is increased to a final value of at least 25% on the weight of the cellulose.

2. Process for the preparation of cellulose esters of lower mono-carboxylic saturated fatty acids of increased stability, which comprises esterifying cellulose by means of an esterifying agent in the presence of sulphuric acid, as catalyst, and ripening the organic ester of cellulose so produced in solution to the desired solubility characteristics in the presence of water in a plurality of stages, wherein, for at least two of the ripening stages, the amount of sulphuric acid present is decreased in part by neutralization thereof and the amount of water present is increased to a final value of at least 25% on the weight of the cellulose.

3. Process for the preparation of cellulose acetate of increased stability, which comprises esterifying cellulose by means of acetic anhydride in the presence of acetic acid as solvent and sulphuric acid as catalyst, and ripening the cellulose acetate so produced in solution to the desired solubility characteristics in the presence of water in a plurality of stages, wherein, for at least two of the ripening stages, the amount of sulphuric acid present is decreased in part by neutralization thereof and the amount of water present is increased to a final value of at least 25% on the weight of the cellulose.

4. Process for the preparation of cellulose esters of lower mono-carboxylic saturated fatty acids of increased stability, which comprises esterifying cellulose by means of an esterifying agent in the presence of an acid esterification catalyst, neutralizing a part of the esterification catalyst at the completion of esterification and adding water for ripening, allowing the cellulose ester to ripen for some time, neutralizing a further part of esterification catalyst and adding more water to a total of at least 25% on the weight of the cellulose, and allowing the cellulose ester to ripen in solution to the desired solubility characteristics.

5. Process for the preparation of cellulose esters of lower mono-carboxylic saturated fatty acids of increased stability, which comprises esterifying cellulose by means of an esterifying agent in the presence of an acid esterification catalyst, neutralizing a part of the esterification catalyst at the completion of esterification and adding water for ripening, allowing the cellulose ester to ripen for some time, neutralizing a further part of esterification catalyst and adding more water, allowing the cellulose ester to ripen for a further period of time, adding an additional quantity of water to a total amount of at least 50% on the weight of the cellulose, and allowing the cellulose ester to ripen in solution to the desired solubility characteristics.

6. Process for the preparation of cellulose esters of lower mono-carboxylic saturated fatty acids of increased stability, which comprises esterifying cellulose by means of an esterifying agent in the presence of sulphuric acid as catalyst, neutralizing a part of the sulphuric acid at the completion of esterification and adding water for ripening, allowing the cellulose ester to ripen for some time, neutralizing a further part of sulphuric acid and adding more water to a total of at least 25% on the weight of the cellulose, and allowing the cellulose ester to ripen in solution to the desired solubility characteristics.

7. Process for the preparation of cellulose esters of lower mono-carboxylic saturated fatty acids of increased stability, which comprises esterifying cellulose by means of an esterifying agent in the presence of sulphuric acid as catalyst, neutralizing a part of the sulphuric acid at the completion of esterification and adding water for ripening, allowing the cellulose ester to ripen for some time, neutralizing a further part of sulphuric acid and adding more water, allowing the cellulose ester to ripen for a further period of time, adding an additional quantity of water to a total amount of at least 50% on the weight of the cellulose, and allowing the cellulose ester to. riped in solution to the desired solubility characteristics.

8. Process for the preparation of cellulose acetate of increased stability, which comprises acetylating cellulose by means of acetic anhydride in the presence of acetic acid as solvent and sulphuric acid as catalyst, neutralizing a part of the sulphuric acid at the completion of esterification and adding water for ripening, allowing the cellulose ester to ripen for some time, neutralizing a further part of sulphuric acid and adding more water to a total of at least 25% on the weight of the cellulose, and allowing the cellulose ester to ripen in solution to the desired solubility characteristics.

9. Process for the preparation of cellulose acetate of increased stability, which comprises acetylating cellulose by means of acetic anhydride in the presence of acetic acid as solvent and sulphuric acid as catalyst, neutralizing a part of the sulphuric acid at the completion of esterification and adding water for ripening, allowing the cellulose ester to ripen for some time, neutralizing a further part of sulphuric acid and adding more water, allowing the cellulose ester to ripen for a further period of time, adding an additional quantity of water to a total amount of at least 50% on the weight of the cellulose, and allowing the cellulose acetate to ripen in solution to the desired solubility characteristics.

10. Process for the preparation of cellulose acetate of increased stability, which comprises acetylating cellulose by means of acetic anhydride in the presence of acetic acid as solvent and sulphuric acid as catalyst, neutralizing from 28.5 to 85.7% of the sulphuric acid at the completion of acetylation and adding from 5 to 25% of water for ripening, on the weight of the cellulose, allowing the cellulose acetate to ripen for some time, neutralizing 50 to 95% of the remaining sulphuric acid and adding a further quantity of water to make a total of 25 to 150% on the weight of the cellulose, and allowing the cellulose acetate to ripen in solution to the desired solubility characteristics.

11. Process for the preparation of cellulose acetate of increased stability, which comprises acetylating cellulose by means of acetic anhydride in the presence of acetic acid as solvent and sulphuric acid as catalyst, neutralizing from 20 to 98% of the sulphuric acid at the completion of acetylation and adding from 5 to 50% of water for ripening, on the weight of the cellulose, allowing the cellulose acetate to ripen for some time, neutralizing 40 to 50% of the sulphuric acid remaining and adding a further quantity of water to make a total of 30 to 75% on the weight of the cellulose, allowing the cellulose acetate to ripen for a further period of time, adding further water to make a total of 50 to 200% on the weight of the cellulose, and allowing the cellulose acetate to ripen in solution to the desired solubility characteristics.

12. Process for the preparation of cellulose acetate of increased stability, which comprises acetylating cellulose by means of acetic anhydride in the presence of acetic acid as solvent and sulphuric acid as catalyst, neutralizing from 28.5 to 85.7% of the sulphuric acid at the completion of acetylation and adding from 5 to 25% of water for ripening, on the weight of the cellulose, allowing the cellulose acetate to ripen for from 1 to 5 hours, neutralizing 50 to 95% of the remaining sulphuric acid and adding a further quantity of water to make a total of 25 to 150% on the weight of the cellulose, and allowing the cellulose acetate to ripen to the desired solubility characteristics.

13. Process for the preparation of cellulose acetate of increased stability, which comprises acetylating cellulose by means of acetic acid as solvent and sulphuric acid as catalyst, neutralizing from 20 to 98% of the sulphuric acid at the completion of acetylation and adding from 5 to 50% of water for ripening, on the weight of the cellulose, allowing the cellulose acetate to ripen for from 1 to 5 hours, neutralizing an additional 40 to 50% of the sulphuric acid remaining and adding a further quantity of water to make a total of 30 to 75% on the weight of the cellulose, allowing the cellulose acetate to ripen for from 2 to 7 hours, adding further water to make a total of 50 to 200% on the weight of the cellulose, and allowing the cellulose acetate to ripen in solution to the desired solubility characteristics.

14. Process for the preparation of cellulose acetate of increased stability, which comprises acetylating cellulose by means of acetic anhydride in the presence of acetic acid as solvent and sulphuric acid as catalyst, neutralizing from 28.5 to 85.7% of the sulphuric acid at the completion of acetylation and adding from 5 to 25% of water for ripening, on the weight of the cellulose, allowing the cellulose acetate to ripen for from 1 to 5 hours at a temperature of 25 to 55° C., neutralizing 50 to 95% of the remaining sulphuric acid and adding a further quantity of water to make a total of 25 to 150% on the weight of the cellulose, and allowing the cellulose acetate to ripen in solution to the desired solubility characteristics.

15. Process for the preparation of cellulose acetate of increased stability, which comprises acetylating cellulose by means of acetic anhydride in the presence of acetic acid as solvent and from 7 to 20% of sulphuric acid on the weight of cellulose as catalyst, neutralizing from 20 to 98% of the sulphuric acid at the completion of acetylation and adding from 5 to 50% of water for ripening, on the weight of the cellulose, allowing the cellulose acetate to ripen for from 1 to 5 hours at a temperature of from 25 to 55° C., neutralizing an additional 40 to 50% of the sulphuric acid remaining and adding a further quantity of water to make a total of 30 to 75% on the weight of the cellulose, allowing the cellulose acetate to ripen for from 2 to 7 hours at a temperature of from 40 to 75° C., adding further water to make a total of 50 to 200% on the weight of the cellulose, and allowing the cellulose acetate to ripen in solution to the desired solubility characteristics.

16. Process for the preparation of cellulose acetate of increased stabiilty, which comprises acetylating cellulose by means of acetic anhydride in the presence of acetic acid as solvent and about 14.5% of sulphuric acid as catalyst, neutralizing about 33⅓% of the sulphuric acid at the completion of acetylation and adding about 21% of water on the weight of the cellulose for ripening, allowing the cellulose acetate to ripen at a temperature of 50° C., until a precipitated sample is soluble in hot chloroform, neutralizing an additional 33⅓% of the sulphuric acid and adding about 79% of water on the weight of the cellulose and then ripening in solution at a temperature of about 60° C. until the desired solubility characteristics are reached.

17. Process for the preparation of cellulose acetate of increased stabiilty, which comprises acetylating cellulose by means of acetic anhydride in the presence of acetic acid as solvent and about 20% of sulphuric acid as catalyst, neutralizing 50% of the sulphuric acid at the completion of acetylation and adding about 37% of water on the weight of the cellulose for ripening, allowing the cellulose acetate to ripen at a temperature of from 35 to 40° C. for about 2 hours, neutralizing another 40% of the sulphuric acid and adding another 37% of water on the weight of the cellulose, allowing the cellulose acetate to ripen for about 7 hours as the temperature rises to about 65° C., adding another 76% of water and ripening in solution for 8½ hours more at a temperature of 65 to 70° C. until the desired solubility characteristics are reached.

GEORGE W. SEYMOUR.
MERVIN E. MARTIN.
ROBERT D. ROWLEY.